United States Patent

Nebashi et al.

Patent Number: 6,120,870
Date of Patent: Sep. 19, 2000

[54] OPTICAL DISK AND PRODUCTION METHOD THEREOF

[75] Inventors: Satoshi Nebashi; Takao Nishikawa; Atsushi Takakuwa, all of Suwa, Japan

[73] Assignee: Seiko Epson Corporation, Tokyo, Japan

[21] Appl. No.: 08/776,015

[22] PCT Filed: May 10, 1996

[86] PCT No.: PCT/JP96/01268

§ 371 Date: Jan. 7, 1997

§ 102(e) Date: Jan. 7, 1997

[87] PCT Pub. No.: WO96/36046

PCT Pub. Date: Nov. 14, 1996

[30] Foreign Application Priority Data

May 11, 1995 [JP] Japan ................................. 7-112977

[51] Int. Cl.⁷ ......................................................... B32B 3/00
[52] U.S. Cl. ........................ 428/64.1; 428/64.2; 428/64.4; 428/425.5; 428/913; 430/270.11; 430/495.1; 430/945; 369/283; 369/288; 250/492.1; 427/596
[58] Field of Search ................................. 428/64.1, 64.2, 428/64.4, 424.8, 425.5, 913; 430/270.11, 495.1, 945; 369/275.1, 283, 288; 250/492.1; 427/595, 596

[56] References Cited

U.S. PATENT DOCUMENTS

| 4,275,091 | 6/1981 | Lippits et al. . |
| 4,874,808 | 10/1989 | Minami et al. ........................ 524/291 |
| 5,439,722 | 8/1995 | Brekner ................................. 428/65.1 |

FOREIGN PATENT DOCUMENTS

| 0 424 809 | 5/1991 | European Pat. Off. . |
| 0 446 051 | 9/1991 | European Pat. Off. . |
| 0 509 423 | 10/1992 | European Pat. Off. . |
| 0 540 843 | 5/1993 | European Pat. Off. . |
| 0 542 488 | 5/1993 | European Pat. Off. . |
| 53-86756 | 7/1978 | Japan . |
| 58-173178 | 10/1983 | Japan . |
| 59-038269 | 3/1984 | Japan . |
| 59-178636 | 10/1984 | Japan . |
| 61-68746 | 4/1986 | Japan . |
| 61-292601 | 12/1986 | Japan . |
| 62-018635 | 1/1987 | Japan . |
| 62-095750 | 5/1987 | Japan . |
| 63-244428 | 10/1988 | Japan . |
| 1-150529 | 6/1989 | Japan . |
| 2-247841 | 10/1990 | Japan . |
| 3-144940 | 6/1991 | Japan . |
| 3-144941 | 6/1991 | Japan . |
| 3-144942 | 6/1991 | Japan . |
| 3-144943 | 6/1991 | Japan . |
| 4-229430 | 8/1992 | Japan . |
| 4-310624 | 11/1992 | Japan . |
| 4-311833 | 11/1992 | Japan . |
| 5-62254 | 3/1993 | Japan . |

*Primary Examiner*—Elizabeth Evans
*Attorney, Agent, or Firm*—Mark P. Watson

[57] ABSTRACT

An optical disk having high density and excellent quality as well as compatibility with conventional disks is provided. This optical disk is comprised of a disk-shaped substrate formed with a cyclic olefin polymer as its main component and a light-curing resin layer formed on the disk-shaped substrate, wherein a pattern is formed on the light-curing resin layer based on given information. The same effect can be obtained using a heat-curing resin in place of the light-curing resin. Optical disks having superior characteristics can be mass-produced.

20 Claims, 8 Drawing Sheets

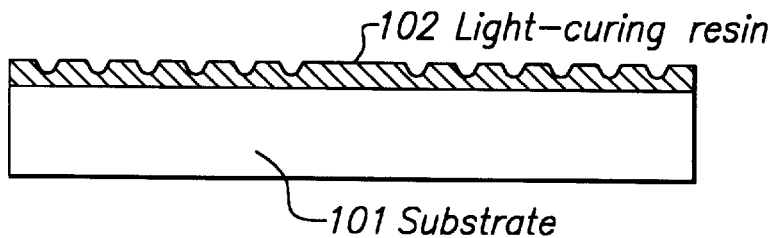
FIG._1
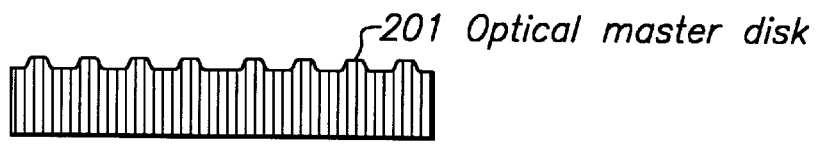
FIG._2a
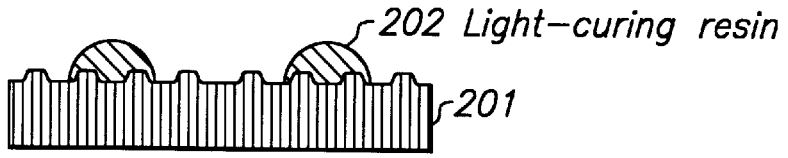
FIG._2b
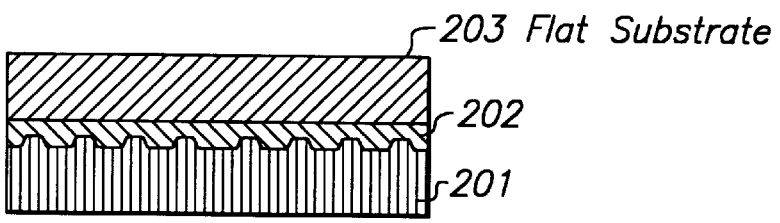
FIG._2c
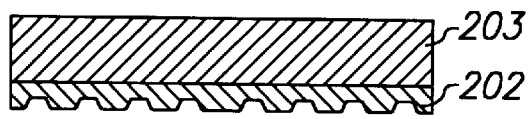
FIG._2d

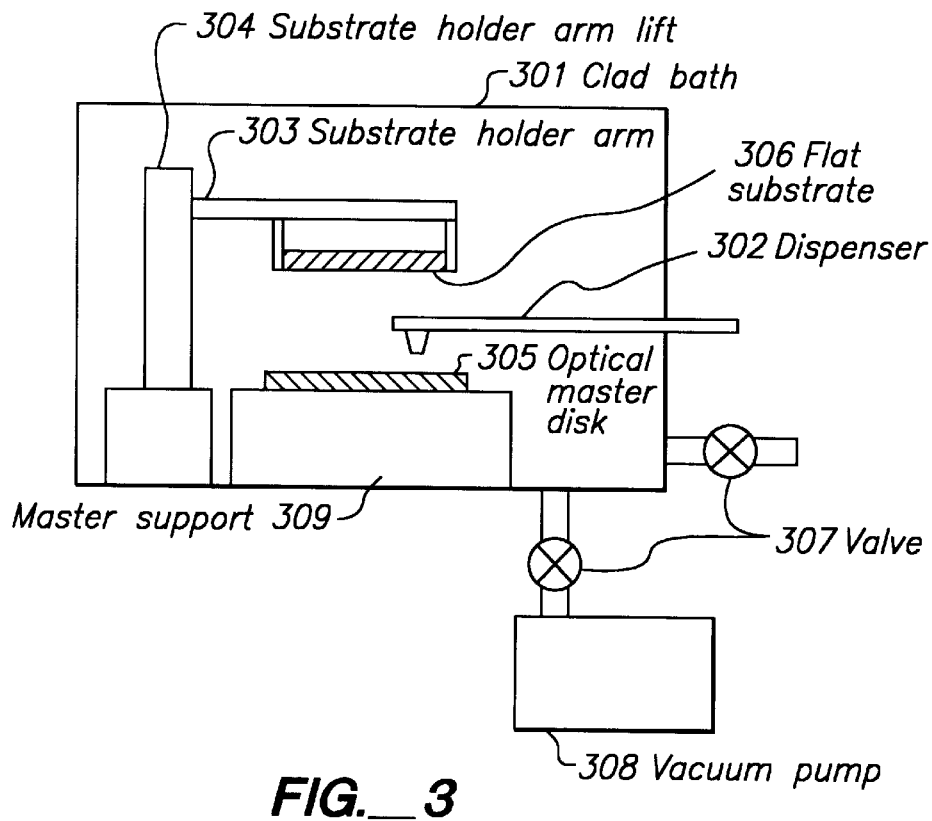
FIG._3
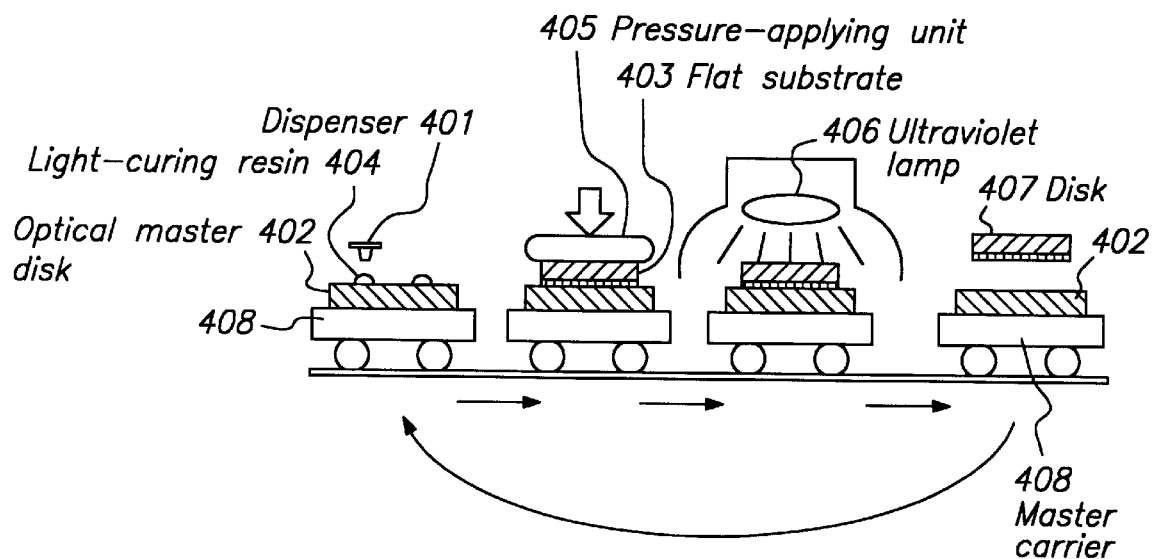
FIG._4

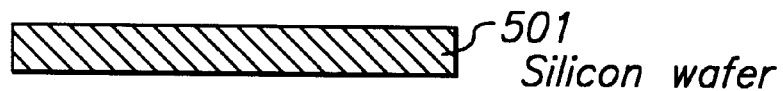
FIG. _ 5a
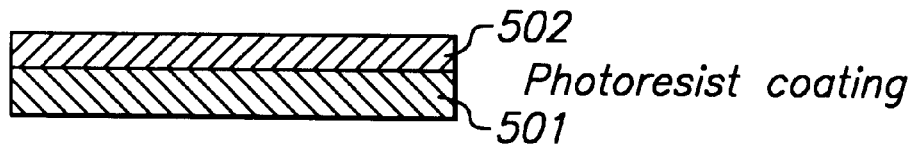
FIG. _ 5b
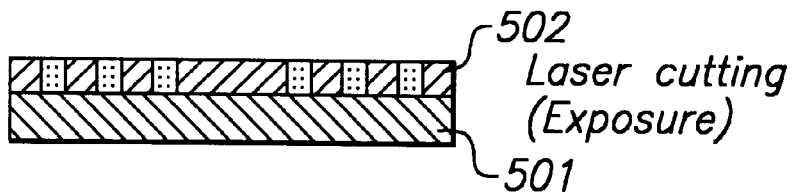
FIG. _ 5c
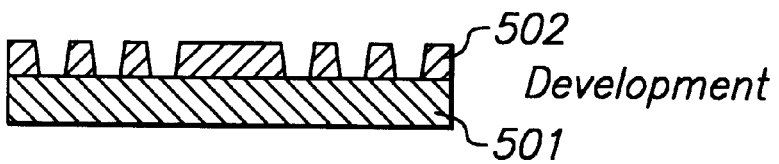
FIG. _ 5d
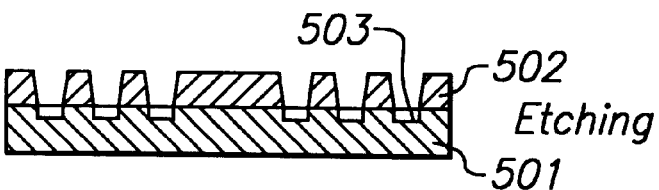
FIG. _ 5e
FIG. _ 5f

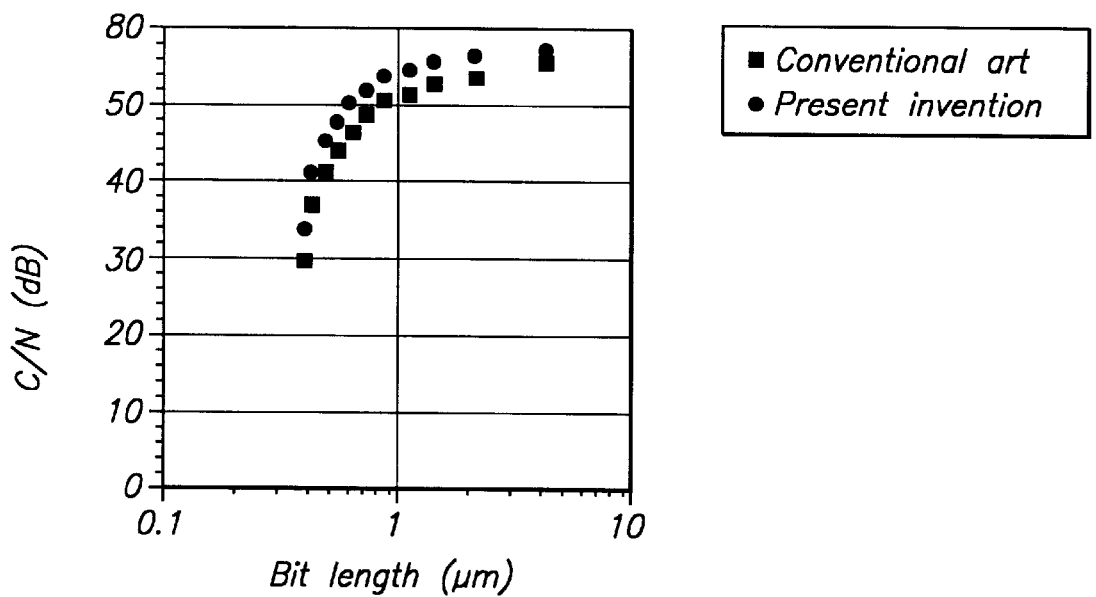
FIG._7
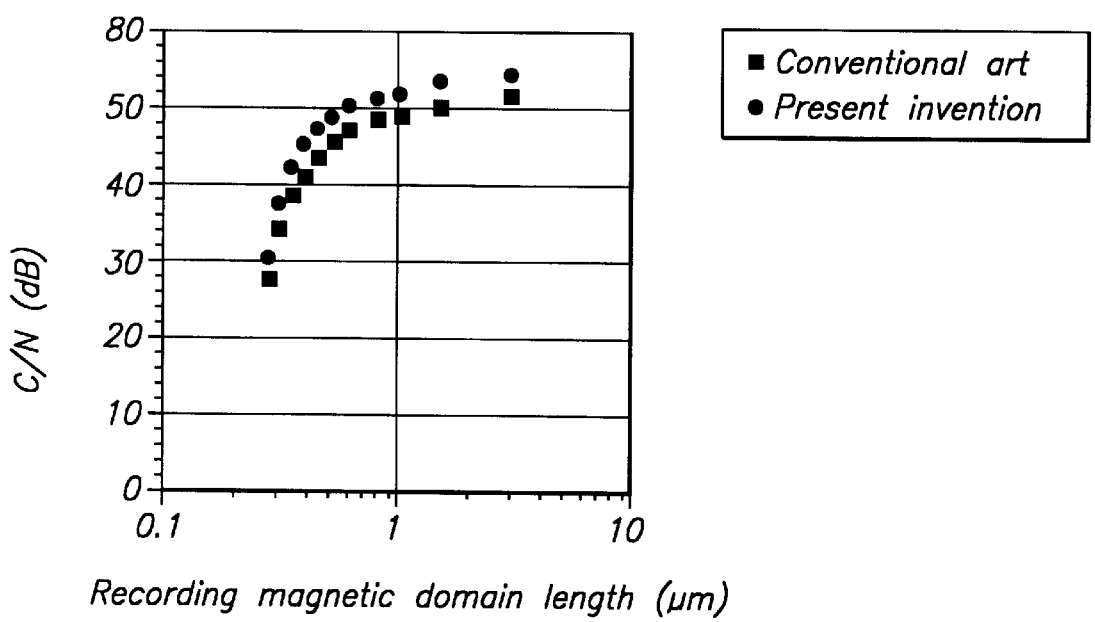
FIG._8

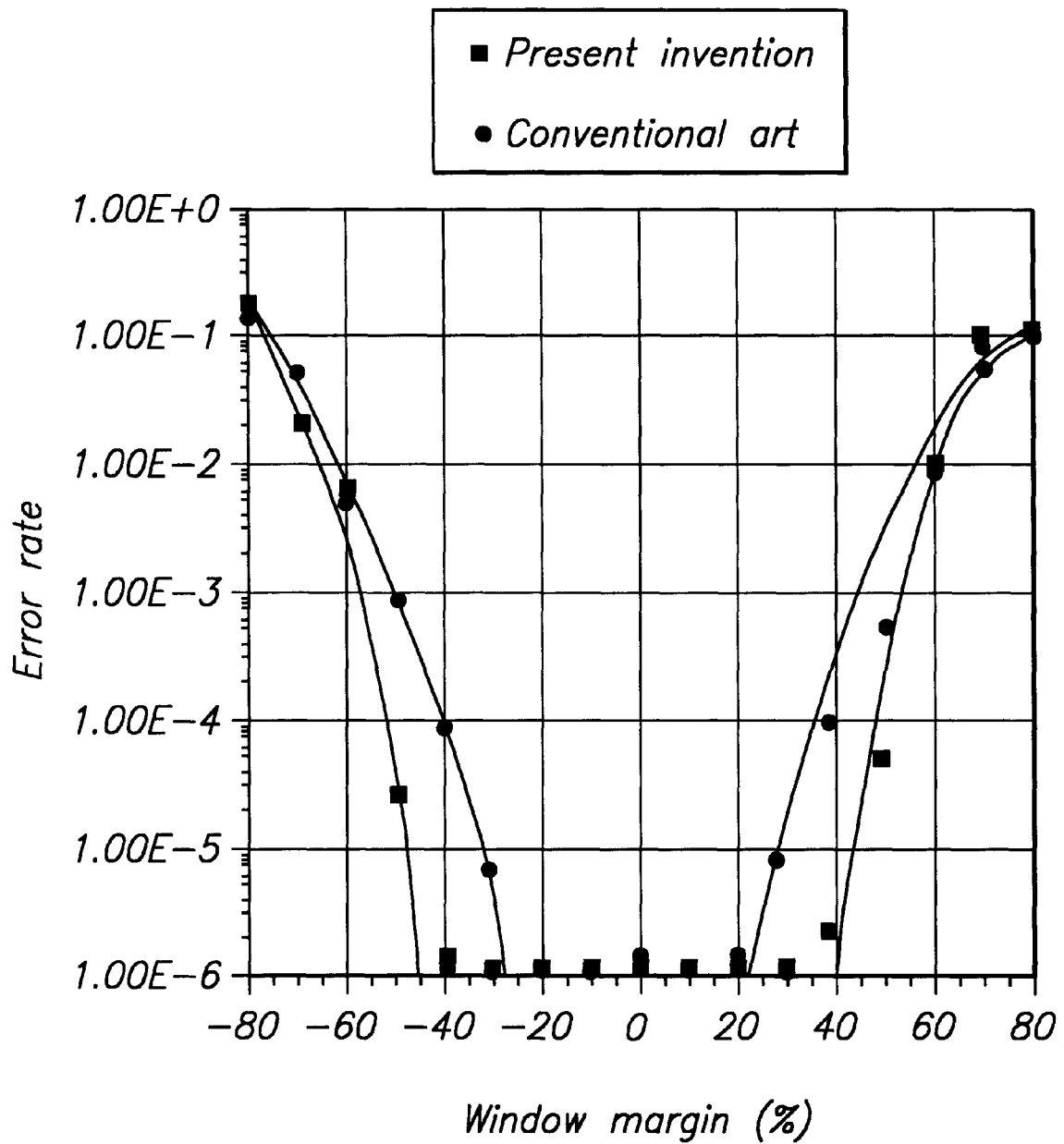
FIG._9

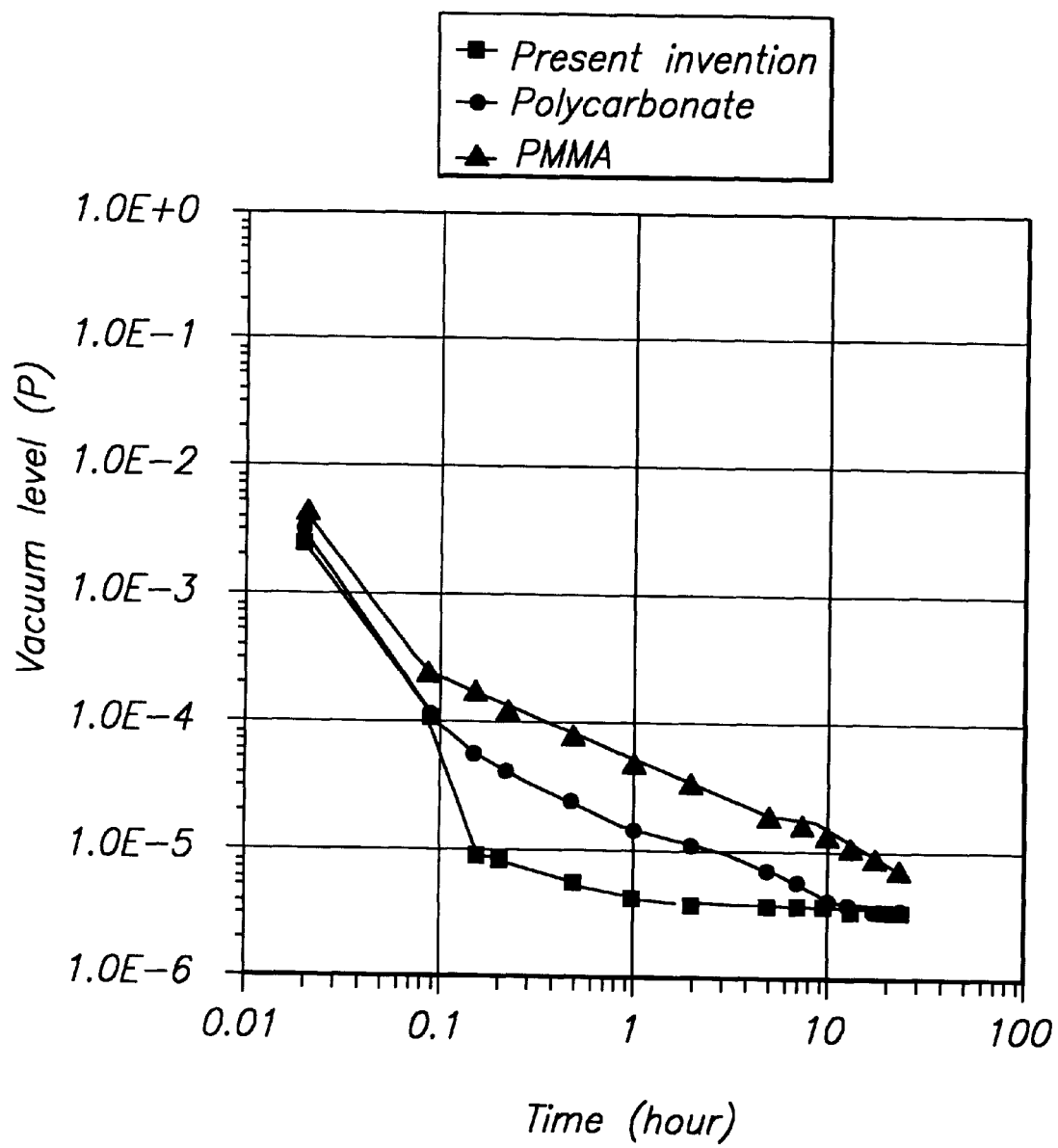
FIG._10

Applying photoresist coating to original glass plate

Laser cutting (Exposure)

Development

Nickel plating

Separating nickel stamper

OPTICAL DISK AND PRODUCTION METHOD THEREOF

FIELD OF THE INVENTION

The present invention relates to an optical disk and the method for producing the optical disk.

BACKGROUND OF THE INVENTION

Conventional production methods for optical disks include, for example, a method in which first an original metal plate (stamper) is created with a negative image of the pattern to be formed on a plastic substrate that forms an optical disk. Then, a substrate is produced by injection molding from the stamper. The stamper is produced, for example, by the method illustrated in FIGS. 11A–E. This particular method is described below.

Generally, an original glass plate is used to create a stamper, and a photoresist 112 is applied to the glass plate 111 as shown in FIG. 11A. Then, as shown in FIG. 11B, a pattern based on the desired information is exposed onto the photoresist 112 using a laser cutting machine. Next, the photoresist 112 is developed, and exposed areas are removed to form a relief-and-indentation pattern on the surface, as shown in FIG. 11C. Then, as shown in FIG. 11D, conductivity treatment is applied (a metal film is vacuum-formed) to the photoresist 112 where the pattern is formed, and nickel plating 113 is added. Next, a nickel stamper 114 is created by separating the nickel plating 113 from the original glass plate 111 on which the pattern was formed, as shown in FIG. 11E.

Injection molding is a method that uses the stamper to produce plastic substrates. Generally, a polycarbonate is used as the plastic substrate material.

Japanese laid-open patent publications No. 1-150529 and No. 4229430 respectively disclose an optical disk in which a cyclic olefin copolymer is used. These publications disclose that the use of a substrate for an optical disk made of a given ethylene/cyclic olefin polymer and a set item of given composition for its adhesive layer allows the production of an optical recording medium that has an adhesive layer with excellent in adhesive strength, water-proofness and moisture-resistance, as well as a substrate layer with superior dimensional stability even under high-temperature and high-humidity conditions, as well as under normal conditions. Further, this substrate has the advantages of excellent heat-resistance and transparency, and it has no color and only a small birefringence, and it hardly warps.

A production method for optical disks using UV-curing resin is disclosed in Japanese laid-open patent publication No. 53-86756. This publication discloses a method that uses UV-curing resin to transfer a pattern to a polymethyl methacrylate, a polycarbonate, etc. a master made of nickel by electroforming (hereinafter, a "master" is used as the equivalent of a stamper).

Alternatively, a method that uses a silicon wafer to create a master for optical disks is disclosed in Japanese laid-open patent publication No. 61-68746. According to the method as disclosed in this publication, silicon oxide is formed on a silicon wafer after which a photoresist is applied and exposed. The photoresist is developed and then the silicon oxide is etched to create a master.

Also, replicas for molding can be produced by other methods from a master made of silicon. Japanese laid-open patent publication No. 4-299937 discloses a method for creating a master by directly etching a silicon wafer. Also, Japanese laid-open patent publication No. 5-62254 discloses a method that uses UV-curing resin to transfer a pattern from a master made of a silicon wafer to a plastic substrate.

Methods disclosed in Japanese laid-open patent publications No. 4-310624 and No. 4-311833 have the advantage that a master produced using a silicon wafer yields optical disks that have enhanced recording density.

Still, it is necessary to highly densify a recording pattern formed on an optical disk in order to increase the amount of data recorded on the disk. To achieve high densification by conventional methods, it is necessary to increase the density of the pattern formed on the stamper. For this reason, it is common to employ a method that reduces the laser wavelength of a laser cutting machine.

However, gas lasers such as helium cadmium lasers with a wavelength at the level of the 400 nm or argon lasers are used in current laser cutting machines, and because the laser itself is not capable of modulating light it is necessary to use an acoustic optical modulator, for example. Therefore, laser cutting devices become very large and unwieldy. Moreover, if the wavelength is to be made shorter, currently the only choice available is a gas laser. For example, if an ultraviolet laser is used there is still a problem in that the life and stability of the laser are not satisfactory.

Methods for producing a substrate by injection molding require the pattern reproducibility to be in proportion to the density because a highly dense pattern is transferred, which causes technical difficulties. For example, the jitters of a reproduced signal depend on the accuracy of the cutting machine's original signal and the preciseness of the bit pattern on the substrate made by injection molding. Because of this, the allowable jitters have to be reduced to one quarter (¼) as the recording density quadruples. However, there is a problem if no countermeasures are taken in that the signal-to-noise ratio (s/n ratio) of the reproduced signal decreases because changes in the pattern produced by the injection molding method are fixed, regardless of pattern size.

In the conventional art, in methods that use an original glass plate, the glass plate must have strict precision in flatness and planeness because the pattern formed on an optical disk is very fine and thus highly precise laser cutting is necessary. For that reason, the glass plate must have a thickness of at least a few mm and a diameter that is 1.5 times larger than the specified diameter of the optical disk to be produced, in order not to effect the uniformity of the plane. For example, when CDs (compact discs) with a diameter of 120 mm are produced, a glass plate with a diameter of the 200 mm level is used. Because of this, the original glass plate is heavier and in order to have high precision it is necessary to increase the size both of the rotating table of the spin-coater for coating the plate with a photoresist and of the laser cutting machine. In a production line, it is also necessary to have larger conveyor equipment to carry the glass plate. Furthermore, since the cost of a highly precise glass plate by itself is high, it is not disposed of and in practice it is always reused after regrinding the surface. Consequently, a regrinding process is also required. Accordingly, this method has the drawback that large scale production facilities are required and it is difficult to simplify the production process which results in high production costs.

In methods for producing a stamper by electroforming, it is necessary for the stamper to have a thickness of 0.2 mm or greater in order to obtain the strength required for a stamper. Therefore, this method has the drawbacks that production is time consuming and thus mass production is not applicable which results in high production costs.

Japanese laid-open patent publication No. 4-259937 recites a method that uses a silicon wafer to directly produce a stamper. This method has the drawback that because a silicon wafer is used to directly carry out the injection molding of a polycarbonate, the hard and fragile silicon wafer can be broken by high transfer pressure applied during injection molding (e.g. 20 tons) or by shear force applied when removing the mold.

Also, Japanese laid-open patent publications No. 61-68746, No. 4-310624 and No. 4-311833 provide improvements with respect to drawbacks that occur in methods using a glass plate by replacing a silicon wafer for the glass plate. But, they still cannot solve the problems caused in the conventional electroforming process because a stamper is produced from a silicon wafer by electroforming. However, it is possible to improve the recording density by methods recited in Japanese laid-open patent publication Nos. 4-310624 and 4-311833.

Further, Japanese laid-open publication No. 5-62254 provides a method that permits mass production while using neither a glass plate nor electroforming. In this method, after a pattern has been transferred to a sheet material, it is necessary that the sheet material be punched and an aluminum reflection film, photoelectromagnetic recording film or phase-changing recording film be formed on the substrate by vacuum metalizing. However, plastic substrates have the drawback that the degree of vacuum of the vacuum device drops due to moisture adsorption, etc. In the above injection molding, a substrate which has been molded at a high temperature is immediately guided to a vacuum device in order to deal with the problem. In this method, however, it is necessary to introduce a new step to let gas out of the substrate prior to vacuum deposition.

Alternatively, in cases where a polycarbonate used in conventional injection molding is used as the substrate material, if variations in the thickness of the light-curing resin coating occur or if microscopic dust is present in the light-curing resin coating, portions that have an unusual reflective index can be observed due to variations in the optical anisotropy of the polycarbonate. This is because contraction during curing does not occur evenly. As a result, servo failure occurs during reproduction of an optical disk or errors occur while recording or reproducing information. Because an optical disk has a thin film such as a reflection film or a recording film that is formed in a process under vacuum, absorbed gas or moisture on the substrate surface has to be fully removed. However, a polycarbonate has a high moisture permeability, and thus it has the drawback of not being ready for vacuum deposition unless it is heated or stored in a vacuum for a long period.

In injection molding, which is the most common conventional method for producing an optical disk, either case of using a polycarbonate or using a cyclic poly olefin resin is heated until it melts and then is poured into a mold under a high pressure. In this method, the mold temperature is set to a lower temperature than the melting temperature of these resins, and the resin is poured into a mold as it cools down. Therefore, the resin has high viscosity and as the pattern to be transferred becomes finer the transfer pressure and temperature have to be increased. However, if the resin temperature is raised too high, resin decomposition occurs which results in an increase of error when regenerating recorded signals, which is undesirable. In addition, the production speed drops significantly.

SUMMARY OF THE INVENTION

The present invention provides improvements over the above-mentioned methods and overcomes the drawbacks of such conventional methods. It provides optical disks that are inexpensive and have enhanced recording density without decreasing signal-to-noise ratios as well as being compatible with conventional disks. Further, the present invention readily permits mass production and allows stampers and substrates to be produced by means of a simple method and simple facilities. Moreover, the present invention provides a method for producing such optical disks that are inexpensive, have enhanced recording density without decreasing signal-to-noise ratios, and that are compatible with conventional disks.

Specifically, the present invention provides an optical disk comprising a disk-shaped substrate that is formed with a cyclic olefin polymer as its main component and a light-curing resin layer that is formed on the disk-shaped substrate, wherein a relief-and-indentation is formed on the light-curing resin layer based on given information.

Further, the present invention provides an optical disk comprising a disk-shaped substrate that is formed with a cyclic olefin polymer as its main component and a heat-curing resin layer that is formed on the disk-shaped substrate, wherein a relief-and-indentation is formed on the heat-curing resin layer based on given information.

The cyclic olefin polymer has the characteristics of low hygroscopicity as well as low gas adsorption. Therefore, when a disk substrate of the present invention is processed, for example, using a vacuum device, workability can be improved without lowering the vacuum level inside the device.

The disk-shaped substrate can be produced by punching out a sheet formed with a cyclic olefin polymer as its main component. Also, the disk-shaped substrate can be produced by injection molding of a material having a cyclic olefin polymer as its main component. Furthermore, by applying an activation treatment to the surface of the disk substrate, adhesiveness with the light-curing resin or heat-curing resin can be improved.

In addition, the present invention provides a method for producing optical disks comprising the step of forming a microscopic pattern on a silicon wafer based on given information; the step of applying light-curing resin to the surface of the silicon wafer where the relief-and-indentation pattern is formed in order to form a light-curing resin layer; the step of placing a disk substrate formed with a cyclic olefin polymer as its main component on the light-curing resin layer or placing the disk substrate on the resin layer and applying pressure to it; and the step of irradiating the light-curing resin layer with ultraviolet rays after the placing and pressure-applying step.

Moreover, the present invention provides a method for producing optical disks comprising the step of forming a microscopic pattern on a silicon wafer based on given information; the step of applying heat-curing resin to the surface of the silicon wafer where the relief-and-indentation is formed in order to form a heat-curing resin layer; the step of placing a disk substrate formed with a cyclic olefin polymer as its main component on the heat-curing resin layer or placing the disk substrate on the resin layer and applying pressure to it; and the step of applying heat treatment to the heat-curing resin layer after the placing and pressure-applying step.

Furthermore, the present invention provides a method for producing optical disks comprising the step of forming a relief-and-indentation on a silicon wafer based on given information; the step of applying light-curing resin to a disk substrate formed with a cyclic olefin polymer as its main component so as to form a light-curing resin layer; the step of placing the silicon wafer on the light-curing resin layer or placing the silicon wafer on the resin layer and applying pressure to it so that the surface of the silicon wafer having the relief-and-indentation pattern is in contact with the light-curing resin layer; and the step of irradiating the light-curing resin layer with ultraviolet rays after the placing and pressure-applying step.

And, furthermore, the present invention provides a method for producing optical disks comprising the step of forming a microscopic pattern on a silicon wafer based on given information; the step of applying heat-curing resin to a disk substrate formed with a cyclic olefin polymer as its main component in order to form a heat-curing resin layer; the step of placing the silicon wafer on the heat-curing resin layer or placing the silicon wafer to the resin layer and applying pressure to it so that the surface of the silicon having the relief-and-indentation pattern formed is in contact with the heat-curing resin layer; and the step of applying heat treatment to the heat-curing resin layer after the placing and pressure-applying step.

Prior to the placing and pressure-applying steps described above, an activation treatment can be applied to the surface of the disk substrate. The activation treatment can be performed by means of corona discharge, UV-irradiation or solvent treatment. For solvent treatment, available methods include coating with solvent as well as exposing to solvent vapor, for example.

The cyclic olefin polymer can be, for example, a 4-methyl-1-pentene/α-olefin copolymer having 4-methyl-1-pentene equal to or greater than 92% by weight, or an ethylene cyclic olefin copolymer in practice composed of a polymerization unit expressed by formula (I) (equal to or greater than 10 mol. %, equal to or less than 60 mol. %) and a polymerization unit expressed by formula (II), as shown below:

Formula (I):

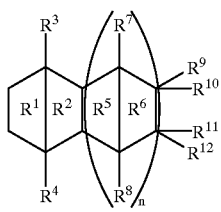

Herein, $R^1$, $R^2$, $R^3$, $R^4$, $R^5$, $R^6$, $R^7$, $R^8$, $R^9$, $R^{10}$, $R^{11}$, and $R^{12}$ are respectively and independently a hydrogen atom; a halogen atom or an alkyl group having a carbon count of 1 to 20, and $R^3$ or $R^{10}$ and $R^{11}$ or $R^{12}$ may be combined with each other to form a cycle of 3 to 6 members. Further, n is a positive integer, and a plurality of $R^5$, $R^6$, $R^7$ and $R^8$ may be the same or different if n is equal to or greater than 2.

Formula (II):

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 illustrates a typical cross section of an optical disk relating to an embodiment of the present invention.

FIGS. 2A through 2D illustrates cross sections in the process of producing an optical disk relating to an embodiment of the present invention.

FIG. 3 is a schematic diagram showing equipment for producing an optical disk relating to an embodiment of the present invention.

FIG. 4 is a schematic diagram showing other equipment for producing an optical disk relating to an embodiment of the present invention.

FIGS. 5A through 5F illustrate cross sections in the process of producing a master using a silicon wafer relating to an embodiment of the present invention.

FIG. 7 shows changes of C/N vs. bit length with respect to a bit signal of an optical disk of the present invention.

FIG. 8 shows changes of C/N vs. recording magnetic domain length with respect to a magneto-optical signal of optical disks of the present invention and of conventional optical disks.

FIG. 9 shows the phase margin of a reproduced signal of optical disks of the present invention and of conventional optical disks.

FIG. 10 shows changes of the level of vacuum in a vacuum chamber for optical disks of the present invention and of conventional optical disks.

DESCRIPTION OF THE PREFERRED EMBODIMENTS

Figure 6A:
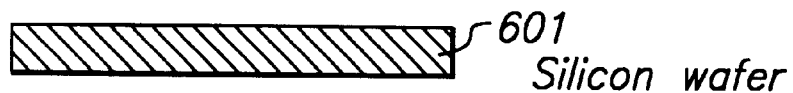
FIGS. 6A through 6F illustrate cross sections in another process of producing a master using a silicon wafer according to the present invention.

FIG. 1 illustrates the cross-sectional structure of an optical disk relating to the present invention. A base material as identified by a reference number 101 is the substrate (disk) composed of a cyclic olefin polymer. A reference number 102 refers to a light-curing resin on which a pattern (for example, bits and grooves) is formed based on given information. An optical disk for reproduction use only is produced by first forming a reflective film and then a protective film for protecting the reflective film on the substrate 101. A magneto-optical disk that is capable of recording and reproducing is produced by first forming a protective film, then a magneto-optical recording film and finally a reflective film on the substrate 101.

The method for producing optical disks according to the present invention will be discussed with reference to drawings. FIG. 2 illustrates cross sections in the process of producing optical disks using a master made of a silicon wafer.

In the step as shown in FIG. 2A, in order to produce an optical master disk 201 that is to be a matrix for optical disks, a silicon wafer has a desired pattern formed on its surface. In the step as shown in FIG. 2B, the optical master disk 201 formed in the step as shown in FIG. 2A is coated with a light-curing resin 202. In the step as shown in FIG. 2C, a flat substrate 203 formed with a cyclic olefin polymer as its main component (e.g. an embodiment containing a cyclic olefin polymer of 92% by weight) is placed on the top of the light-curing resin coating 202 applied in the preceding step, and pressure is applied thereto. By performing this sequence, the light-curing resin 202 penetrates throughout the matrix and thus the matrix shape can be transferred accurately to the light-curing resin 202.

Next, the light-curing resin 202 is irradiated with ultraviolet rays through the substrate 203 to cure the light-curing resin 202. In the step as shown in FIG. 2D, the optical master disk 201 is separated. In this way, a given pattern in the light-curing resin 202 is formed on the substrate 203.

FIG. 3 shows an example of an apparatus used for coating an optical master disk with light-curing resin and applying pressure in accordance with the embodiment shown in FIG. 2.

The apparatus is formed with a master support 309 for placing an optical master disk 305 thereon, a dispenser 302 for coating with a light-curing resin the optical master disk 305 placed on the master support 309, a substrate holder arm 303 for holding a flat substrate 306 that is placed onto the light-curing resin coating on the optical master disk 305 and to which pressure is applied, a substrate holder arm lift 304 for moving the substrate holder arm 303 closer to and farther from the optical master disk 305, a clad bath 301 that contains the foregoing components and that can be sealed, a vacuum pump 308 coupled with the clad bath 301 to reduce the pressure inside the clad bath 301, and a valve 307 disposed between the clad bath 301 and the vacuum pump 308.

In the present embodiment, the steps of coating with light-curing resin by the dispenser 302 and placing the substrate 306 on the optical master disk 305 are carried out under reduced pressure. By carrying out these steps under reduced pressure, it is possible to prevent bubbles from being formed in the light-curing resin. By returning the pressure to normal after placing the substrate 306 on the optical master disk 305, it is possible to apply uniform atmospheric pressure, in other words, to apply the substrate 306 to the light-curing resin with uniform pressure.

FIG. 4 shows an apparatus differing from the foregoing one, which is used to perform the steps of coating with a light-curing resin, applying pressure to a substrate and separating an optical disk mask. In FIG. 4, these steps are carried out in order starting with the step on the left and moving towards the step on the right, as indicated by the arrows.

An optical master disk placed on a master carrier 408 is coated with a light-curing resin 404 which has come through a defoaming bath, using a dispenser 401. A flat substrate 403 which is transparent to ultraviolet rays is placed on the top of the light-curing resin 404, and pressure is mechanically applied thereon by a pressure-applying unit 405. After removing the pressure-applying unit 405, ultraviolet rays are irradiated onto the substrate 403 by an ultraviolet lamp 406 to cure the light-curing resin. Then the substrate 403 to which the light-curing resin 404 is now bonded is separated from the optical master disk to obtain a disk 407 with a given pattern in the light-curing resin 404 formed on the substrate 403.

After the completion of the series of steps, the optical master disk 402 is left on the moving master carrier 408 and returns to the first step of the process in order to make the next disk 407.

In both of the apparatus and processes shown in FIGS. 3 and 4, a light-curing resin coating is applied to the surface of the optical master disk. However, the light-curing resin coating may be applied to the surface of the flat substrate, instead. This has the advantage of reducing the time the optical master disk is in use in the process.

A method for producing an optical master disk to form a pattern on optical disks (mastering) relating to the present invention will be discussed with reference to the drawings.

FIG. 5 shows cross sections in the process of producing an optical master disk relating to the present invention.

In the step as shown in FIG. 5A, a silicon wafer 501 having given dimensions is prepared. In the step as shown in FIG. 5B, the silicon wafer 501 is coated with a positive photoresist 502, using a spin coater. In the step as shown in FIG. 5C, after baking the photoresist 502 coating applied in the preceding step, a pattern based on given information is exposed on the photoresist 502 by a laser cutting machine. Here, laser cutting is carried out in a spiral direction moving from the inside to the outside.

In the step as shown in FIG. 5D, the exposed photoresist 502 is developed. From the development a pit pattern based on given information is formed on the photoresist 502. In the step as shown in FIG. 5E, dry etching is carried out to form pits 503 on the surface of the silicon wafer 501, using the portion of the photoresist 502 that remains after the preceding step as a mask. Then, in the step as shown in FIG. 5F, the photoresist 502 is removed. In the process as discussed above an indentation pattern based on given information is formed on the silicon wafer 501.

The photoresist 502 in the step as shown in FIG. 5B is eventually used as a mask for dry etching in the step shown in FIG. 5E, and thus it is preferable for it to have a certain thickness. In producing conventional masters for optical disks, the photoresist has a thickness equivalent to the depth of the grooves or pits to be formed. Therefore the thickness ranges from about 0.1 μm to 0.2 μm. In this embodiment, the silicon wafer is etched as deeply as the conventional pit depth. Therefore, taking the final reflective index of the substrate material into account, the optical depth is set to be approximately $\lambda/(4n)$ (wherein $\lambda$ is the wavelength and n is the refractive index). Here, it is possible to enhance the pattern density by using a method as recited in Japanese laid-open patent publications 4-310624 and 4-311833. Specifically, it is a method that attenuates development to reduce exposure of a silicon wafer or that cuts using optical super-resolution to similarly reduce exposure of a silicon wafer.

Another method for producing an optical master disk to form a pattern on optical disks relating to the present invention is discussed with reference to FIG. 6, which illustrates cross sections in the other process of producing an optical master disk relating to the present invention.

Figure 6B:
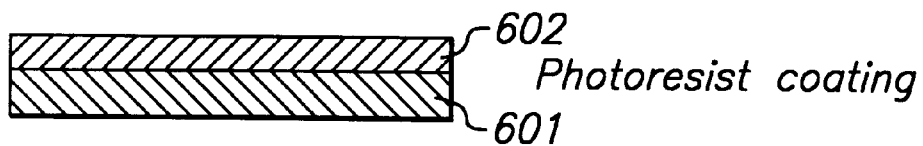
Figure 6C:
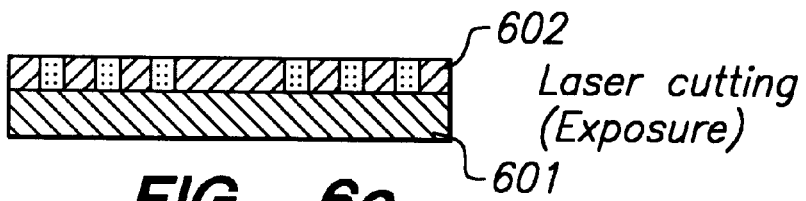

In the step as shown in FIG. 6A, a silicon wafer 601 having given dimensions is prepared. In the step as shown in FIG. 6B, the silicon wafer is coated with a negative photoresist 602, using a spin coater. In the step as shown in FIG. 6C, after baking the photoresist 602 coating applied in the preceding step, a pattern based on given information is exposed on the photoresist 602 by a laser cutting machine. Here, laser cutting is carried out in a spiral direction moving from the inside to the outside.

Figure 6D:
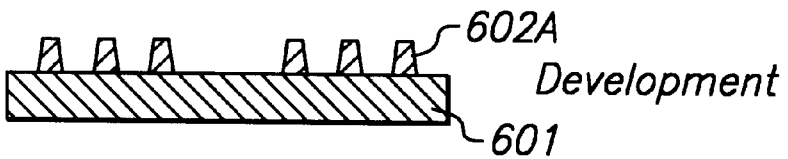
Figure 6E:
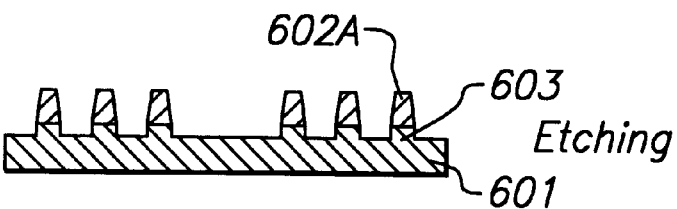

In the step as shown in FIG. 6D, the exposed photoresist 602 is developed. From this development a relief pattern 602A is formed on the photoresist 602 based on given information. In the step as shown in FIG. 6E, dry etching is carried out to form a relief 603 on the surface of the silicon wafer 601, using as a mask the relief pattern 602A produced in the step as shown in FIG. 6D.

Figure 6F:
Figure 11A:
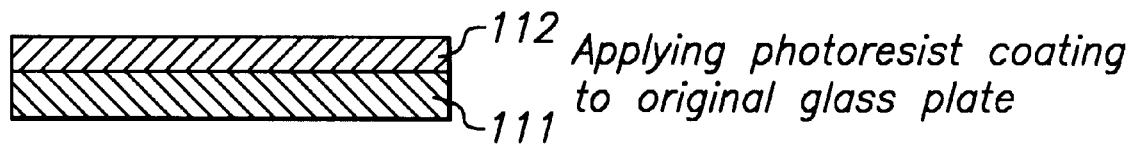
FIGS. 11A through 11E illustrate cross sections in the process of producing a master using a conventional glass plate.
Figure 11B:
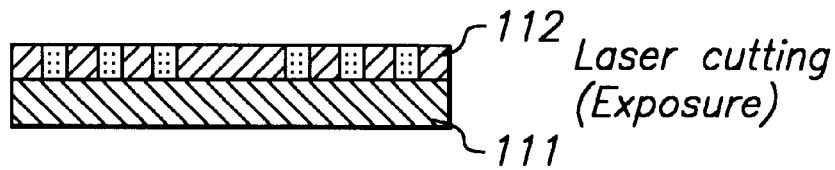
Figure 11C:
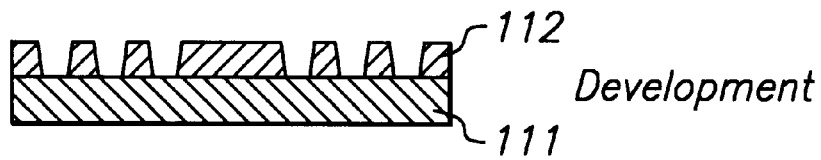
Figure 11D:
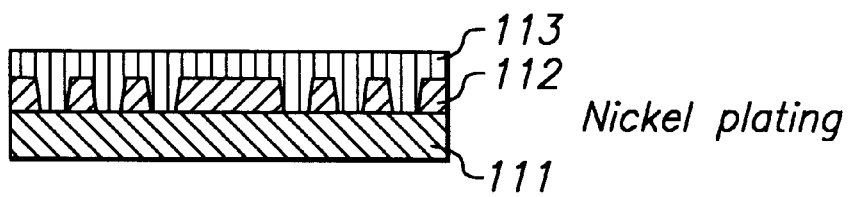
Figure 11E:
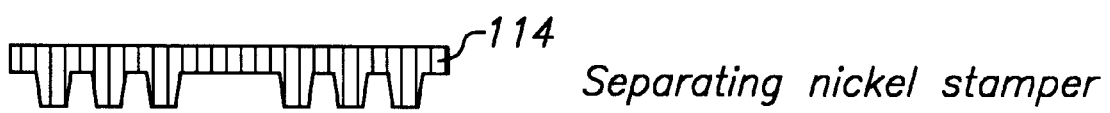

Then, in the step as shown in FIG. 6F, a relief pattern 602A which was used as a mask in the dry etching step is removed. In the process as discussed above, a relief pattern is formed on the silicon wafer based on given information. It is necessary that each of the negative and positive photoresists has a thickness of at least 100 nm. This is because otherwise the resist pattern will fade away in the dry etching process. Because of the characteristics of spin coating, it is practical to have a thickness of equal to or less than 1 μm.

By applying a treatment to activate the surface of the flat substrate prior to bonding a light-curing resin to the substrate, optical disks in the present invention can have further improved adhesiveness between the substrate and the light-curing resin. This activation treatment can be carried out, for example, by means of corona discharge, UV-irradiation, solvent coating or exposure to solvent vapor.

A substrate formed by injection molding may be used as the substrate for optical disks in the present invention for the following reasons. In cases where a vacuum deposition is used to form a film on a substrate formed by injection molding, it is necessary to go through a step of removing gas from the substrate before forming the film. However, a substrate made of a cyclic olefin polymer does not have to undergo a process of removing gas because the substrate has low hygroscopicity and low gas adsorption. Therefore, it is easy to form thin films such as a reflective film or a recording film on a substrate relating to the present invention using a vacuum device, after forming a pattern based on given information on a light-curing resin.

A relief-and-indentation pattern that is an element of an optical disk relating to the present invention may be formed using heat-curing resin in place of the light-curing resin.

Light-curing resins include, for example, those containing acrylate or methacrylate as a main component and further containing a photopolymerization initiator.

Heat-curing resins include, for example, those whose main component is epoxy resin or epoxy compound.

The following is a more specific explanation of embodiments of the present invention.

In a first embodiment (Embodiment 1), an optical disk having the structure as shown in FIG. 1 was formed using the steps as shown in FIG. 2. Specifically, first, an optical master disk was prepared, with microscopic relief with given information formed on a 6 inch diameter silicon wafer using the method as shown in FIG. 6. The track pitch is 1.0 μm. Given information means records of signals of constant frequency used to form patterns of various bit lengths on a disk. A substrate having a flat surface made of a 1.2 mm thick cyclic olefin polymer of 120 mm in diameter was produced using an injection mold, and an activation treatment is applied to the substrate by means of a corona discharge.

Then, the optical master disk made of the silicon wafer was coated with light-curing resin. The substrate was placed on the light-curing resin, and pressure was applied to make the light-curing resin penetrate it thoroughly. Then UV-irradiation was applied to cure the light-curing resin in order to fix the pattern. After the substrate was separated from the optical master disk while applying vacuum adsorption, an aluminum alloy film was formed on the patterned light-curing resin by a sputtering device to produce an optical disk.

For comparison, another optical disk was prepared. In this case, a substrate for the optical disk was made of a 1.2 mm thick polycarbonate of 120 mm in diameter by the injection molding method using a regular nickel stamper with the same information, and the disk substrate was sputtered in the same manner.

An optical pickup with a wavelength of 685 nm and an objective lens numerical aperture of 0.55 was used to make a comparison of the C/N of signals recorded on the optical disks. The optical disk's revolution speed at a reproduction was set to 3000 and the linear speed was set to 9.4 m/s. FIG. 7 shows the results.

As seen in FIG. 7, the optical disk of the present invention shows a higher C/N for long bits through short bits, compared to those of the optical disk formed by the injection mold, especially showing higher values for shorter bits. The reason is that the surface of the optical master disk made of the silicon wafer has a higher degree of flatness compared to the surface of the stamper made of nickel, and thus noise can be reduced. The level of surface flatness of the nickel stamper depends on the surface flatness of the photoresist coating applied to the glass plate and the effectiveness of such measures as conductivity treatment. On the other hand, in the case of a silicon wafer, basically the condition of the surface of the silicon itself appears as is. Silicon used in producing semiconductors has a surface whose degree of flatness is extremely high. In this experiment, the surface roughness (relief-and-indentation) of the optical disk made of a polycarbonate that is formed using the nickel stamper was determined to be 20 nm on average, whereas that of the optical disk of the present invention was 5¼ nm.

As in Embodiment 1, an optical disk in a second embodiment of the present invention (Embodiment 2) having the structure as shown in FIG. 1 was formed using the following steps. First, an optical disk having grooves formed at 1.0 μm pitches on a 6 inch diameter silicon wafer was prepared by the method as shown in FIG. 5. The grooves are formed about 0.35 μm wide. A substrate having a flat surface was made of a 1.2 mm thick cyclic olefin polymer of 86 mm in diameter by the injection molding method, and an activation treatment was applied to the surface of the substrate. The optical master disk made of a silicon wafer was coated with a light-curing resin. The substrate was placed on the light-curing resin, and pressure was applied to make the light-curing resin penetrate it thoroughly.

Then the light-curing resin was irradiated with ultraviolet rays to cure the light-curing resin in order to fix the pattern. The substrate was separated from the optical master disk while applying vacuum adsorption, and then using a sputtering device a 50 nm thick silicon nitride film, a 20 nm thick TbFeCo magneto-optical recording film, a 20 nm silicon nitride film and a 60 nm aluminum film were formed on the patterned light-curing resin in the foregoing order to produce a magneto-optical disk.

For comparison, another magneto-optical disk was prepared. In this case, the substrate for the magneto-optical disk was made of a 1.2 mm thick polycarbonate of 86 mm in diameter by the injection molding method using a regular nickel stamper having the same track pitches, and the disk substrate was sputtered in the same manner.

A signal was recorded on the optical disk using an optical pickup having a wavelength of 532 nm and an objective lens numerical aperture of 0.55 to compare the C/N of the reproduced signal. For both recording and reproducing, the disk's revolution speed was set to 1800 and the linear speed was set to 5.5 m/s. FIG. 8 shows the results. As seen in FIG. 8, the optical disk of the present invention shows a higher C/N at all frequencies compared to those of the optical disk produced by the injection mold.

The difference as shown in these results, results from the difference between the surface flatness of the silicon wafer and the nickel stamper, as in Embodiment 1.

Further, a phase-changing recording film was formed on the two types of substrate. Specifically, a 70 nm thick silicon oxide film, a 20 nm thick GeSbTe recording film, a 20 nm thick silicon oxide film and a 60 nm reflective aluminum film were formed on the substrate to conduct the same test. As a result, an improvement of the C/N of an average of more than 2 dB was observed.

In another example, a nickel stamper having a given pattern formed at track pitches of 0.8 µm and an optical master disk made of silicon according to another embodiment of the present invention (Embodiment 3) were prepared. The nickel stamper was made in a conventional manner using an original glass plate. The silicon optical master disk was made following the method as shown in FIG. 6. A laser cutting machine that uses a helium cadmium laser having a wavelength of 442 nm was used, which is the same as above.

Following the method as shown in FIG. 2, a desired pattern was formed on light-curing resin that had been formed on an injection-molded substrate of a cyclic olefin polymer to produce an optical master disk made of silicon. This is Sample 1.

Following the conventional injection molding method, an optical disk made of a cyclic olefin polymer was produced using the nickel stamper. This is Sample 2.

These samples (disks) were tested with respect to the relationship between the window margin (%) of a reproduced signal and the signal reproduction error rate (error rates). The results are shown in FIG. 9. As seen in the figure, the optical disk produced in the conventional method shows a margin of 25% with respect to a signal reproduction error rate of 1.00E-6, while the optical disk of the present invention shows a margin exceeding 40%.

Such a wide phase margin as this indicates low noise throughout the entire signal band.

In another embodiment of the present invention (Embodiment 4), substrate made of a cyclic olefin polymer having a pattern transferred thereon from the optical master disk used in Embodiment 1 was prepared, following the method of the present invention as shown in FIG. 2. In addition, a conventional flat substrate made of polycarbonate having the pattern transferred thereon and a flat substrate made of polymethyl methacrylate having the pattern transferred thereon were prepared.

Any of the flat substrates used as a substrate to form a pattern using a UV-curing resin as described above was produced in the injection-molding method. The substrates made by injection molding were stored for 24 hours in a normal environment having a humidity of 50% and a temperature of 23° C. After that, a pattern was formed on the substrate, and then the substrate was placed in a vacuum chamber and the vacuum level was measured. FIG. 10 shows the change of the vacuum level for each of the substrates.

As seen in FIG. 10, when forming a recording film or a reflective film on the substrate by sputtering, the present invention allows the film to be formed in about 10 minutes if having 1.00E-5 Pa is its standard. On the other hand, it is shown that the flat substrate made of polycarbonate takes 3 hours to from and the flat substrate made of polymethyl methacrylate takes 20 hours to form.

In another embodiment of the present invention (Embodiment 5), a substrate made of a cyclic olefin polymer was produced by the injection molding method, using a nickel stamper with track pitches of 0.8 µm. In this case, it took 12 seconds to mold a piece even under optimal molding conditions. However, for the flat substrates, it took 4 seconds per piece using the same injection molding machine when produced under optimal conditions.

As for optical disks for reproduction use only, productivity depends on the injection molding capacity because it is possible to carry out the formation of reflective and protective films in a very short time. Therefore, if the substrate production method relating to the present invention is used, productivity depends on the pattern-transfer rate of the light-curing resin.

The basic process of forming a pattern by light-curing resin is comprised of the step of contacting the flat substrate with the optical master disk (filling the light-curing resin), the step of photopolymerization and the step of separation. Since production rates depend on the injection molding speed of flat substrates, productivity can be increased especially if a cyclic olefin polymer is used.

On the other hand, in cases where optical disks for reproduction use only are produced by means of injection molding, stampers need to be changed more often. This is because the production volume of optical disks is determined by demand for the disks, but on average the number of disks in demand is less than the product life of a stamper. In injection molding, it is necessary to keep the mold temperature at a relatively high and constant temperature. In addition, it takes a very long time to change stampers because each and every stamper is fine-tuned with respect to molding conditions (such as mold temperature, clamping pressure and so on).

In contrast, in cases where the method of the present invention is used, the production of flat substrates by means of injection molding can be carried on continuously until the mold's life comes to the end, and thus production efficiency can be very high. Optical master disks according to the present invention can be changed in a much shorter time compared to stampers. This is because it is not necessary to increase the temperature of the optical master disks and the preciseness of pattern transfer can be set unconditionally by the light-curing resin, and thus it is not necessary to set conditions.

In another embodiment of the present invention (Embodiment 6), a means of extrusion molding a plate made of a 1.2 mm thick cyclic olefin polymer was produced. A disc of 120 mm in diameter was punched out of the plate. Using the disc as the flat substrate, an optical disk according to the present invention was produced. The same optical master disk used in Embodiment 1 was used, and the production method in Embodiment 1 was also applied except for the production of the flat substrate.

A comparison of signal amplitude of this optical disk to the disk having the substrate made of a cyclic olefin polymer produced by means of injection molding with reference to Embodiment 1 showed that both have an equal maximum amplitude. However, it was also shown that a fluctuation in the amplitude in a single turn was observed with respect to the disk relating to this embodiment and that the fluctuation was about 10% of the maximum amplitude. A fluctuation of this level does not cause any problems in signal reproduction, and thus it is fully usable as an optical disk.

Extrusion molding provides higher productivity compared to injection molding, and it allows production speed to be 10 times faster than injection molding even including the time required for punching out the substrates. Therefore, even though the signal quality deteriorates to an extent, the deterioration is of a level that does not cause any practical problems and a substantial increase in productivity can be achieved.

In another embodiment of the present invention (Embodiment 7), an activation treatment was applied to a flat substrate made of a cyclic olefin polymer, and then a pattern was formed using light-curing resin.

In order to have a quantitative estimation of the effectiveness of the activation treatment, the adhesiveness between the light-curing resin and the substrate and also the extent of the separation by heat history were determined. In determining the adhesiveness, adhesive tape was applied to the light-curing resin, and when the tape was removed the area of the resin layer that detached was measured in order to quantify adhesiveness.

On the other hand, in determining the heat history, the substrate was removed from a constant temperature bath held at a temperature of −15° C. and put into another one held at 40° C. and kept there for 15 minutes before it was put back into the −15° C. bath for another 15 minutes. This process was repeated 10 times to determine the extent of separation of the light-curing resin layer in the same manner as discussed above.

Methods of exposing the substrate surface to plasma under reduced pressure, exposing it to corona discharge, spin-coating it with alcohol-diluted toluene, and exposing it to cyclohexane vapor were used as ways to apply the activation treatment.

In the method of exposing the substrate to plasma under reduced pressure, the flat substrate was placed in a vacuum chamber and the pressure was reduced to 5×10E-5 Pa. Then argon gas was introduced into the vacuum chamber and the vacuum was held at 0.4 Pa. Further, a high frequency of 13.56 MHz was applied to the substrate to create plasma by ionizing the argon. The substrate was kept under these conditions for 30 seconds and then taken out of the vacuum chamber.

In the corona discharge method, the substrate was placed between circular electrodes of 200 mm in diameter, and a corona discharge was created with electric power of 500 W to expose the substrate to the discharge for about 30 seconds.

The foregoing separation and heat history tests were conducted with respect to substrates with and without activation treatments. Table 1 shows the results. Numerals shown in Table 1 indicate the area of the separations. As seen in Table 1, substrates with activation treatments have improved adhesion of the light-curing resin layer, compared to the substrates without the treatments. It was also found that the effectiveness of these surface treatments lasts for about 3 hours after the treatment has been applied.

TABLE 1

| Surface treatment | Adhesive tape separation test | Heat history test |
| --- | --- | --- |
| Plasma treatment | 0% | 0% |
| Corona discharge | 0% | 0% |
| Toluene | 15% | 10% |
| Cyclohexane | 0% | 0% |
| No treatment | 100% | 60% |

The density of optical disks according to the present invention can be easily increased, when used for reproduction only, for magneto-optical recording or for phase change recording. The optical disks provide excellent signal quality even though their density is increased. This is because the etched silicon wafer surface is very flat compared to the conventional nickel stamper and pattern transfer via light-curing resin has higher transfer rates compared to the conventional injection molding. This is effective throughout the entire signal band, and thus excellent S/N ratios can be achieved and the present invention is superior to the conventional art with respect to a recording or reproduction beam spot servo.

Further, according to the production method of optical disks according to the present invention, after molding a substrate for a disk made of a cyclic olefin polymer as its main component, unlike the conventional method, it is not necessary to leave it exposed to the air for a certain period of time. Since the substrate for the disk has a low hygroscopicity and a low gas adsorption, it is easy to form a thin film such as a reflective film, a recording film, etc. by a vacuum deposition after a desired pattern based on given information has been formed on the substrate via a light-curing resin. This easily permits mass production and allows stampers and substrates to be produced by a simple method and in simple facilities. In addition, recording density can be enhanced without decreasing the signal's S/N ratios, and optical disks that are compatible with conventional disks can be produced at a low cost. In the case of production in which flat substrates are produced by punching out a flat plate such as extrusion molding, this effectiveness improves further. Even if flat substrates made by injection molding and having excellent signal quality are used, it is possible to significantly increase the injection speed compared to conventional injection molding.

Moreover, applying a surface treatment to the surface of the flat substrate permits the improvement of reliability of the optical disk in transferring a pattern via light-curing resin. Effectiveness of the surface treatment lasts for a certain period of time, and thus it poses no impediment to mass production.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of producing optical disks comprising the step of forming a curing resin layer on the surface of a silicon wafer having a pattern thereon, the step of placing a disk substrate formed with a cyclic olefin polymer as its main component on the curing resin layer, and the step of curing said curing resin layer after the placement step.

2. A method of producing optical disks comprising the step of forming a curing resin layer on a disk substrate formed with a cyclic olefin polymer as its main component, the step of placing a silicon wafer onto the curing resin layer so that the surface of the silicon wafer having a pattern formed thereon is in contact with the curing resin layer, and the step of curing said curing resin layer after the placement step.

3. A method of producing optical disks comprising the step of forming a curing resin layer on the surface of a silicon wafer having a pattern thereon, the step of placing a disk substrate formed with a cyclic olefin polymer as its main component on the curing resin layer and applying pressure thereon, and the step of curing said curing resin layer after the placement and pressure-applying step.

4. A method of producing optical disks comprising the step of forming a curing resin layer on a disk substrate formed with a cyclic olefin polymer as its main component, the step of placing a silicon wafer onto the curing resin layer so that the surface of the silicon wafer having a pattern formed thereon is in contact with the curing resin layer and applying pressure thereon, and the step of curing said curing resin layer after the placement and pressure-applying step.

5. An optical disk produced in accordance with the method of one of claims 1, 2, 3 or 4.

6. An optical disk of claim 1, wherein said curing resin layer is a light-curing resin layer.

7. An optical disk of claim 1, wherein said curing resin layer is a heat-curing resin layer.

8. An optical disk of claim 5, wherein said disk substrate is a punched out flat plate formed with a cyclic olefin polymer as its main component.

9. An optical disk of claim 5, wherein said disk substrate is injection molded from a material having a cyclic olefin polymer as its main component.

10. An optical disk of claim 5, wherein an activation treatment is applied to the surface of said disk substrate.

11. A method of producing optical disks of claim 7 or 2 or 3 or 4, wherein said curing resin layer is a light-curing resin layer, and said light curing resin layer is cured by irradiating said layer with ultraviolet rays.

12. A method of producing optical disks of claim 7 or 2 or 3 or 4, wherein said curing resin layer is a heat-curing resin layer, and said heat-curing resin layer is cured by applying a heat treatment thereto.

13. A method of producing optical disks of claims 1 or 2, wherein prior to said step of placing, further including the step of applying an activation treatment to the surface of said disk substrate.

14. A method of producing optical disks of claim 13, wherein said activation treatment step is carried out by means of a corona discharge.

15. A method of producing optical disks of claim 13, wherein said activation treatment step is carried out by irradiation with ultraviolet rays.

16. A method of producing optical disks of claim 13, wherein said activation treatment step is carried out by treatment with a solvent.

17. A method of producing optical disks of claims 3 or 4, wherein prior to said step of pressure-applying, further including the step of applying an activation treatment to the surface of said disk substrate.

18. A method of producing optical disk of claim 17, wherein said activation treatment step is carried out by means of a corona discharge.

19. A method of producing optical disks of claim 17, wherein said activation treatment step is carried out by irradiation with ultraviolet rays.

20. A method of producing optical disks of claim 17, wherein said activation treatment step is carried out by treatment with a solvent.

* * * * *

UNITED STATES PATENT AND TRADEMARK OFFICE
CERTIFICATE OF CORRECTION

PATENT NO. : 6,120,870
DATED : September 19, 2000
INVENTOR(S) : Satoshi Nebashi, et al.

It is certified that error appears in the above-identified patent and that said Letters Patent is hereby corrected as shown below:

Column 15,
Line 3 change "claim 1" to --claim 5--.
Line 5 change "claim 1" to --claim 5--.
Line 15 change "claim 7" to --claim 1--.
Line 19 change "claim 7" to --claim 1--.

Signed and Sealed this

Nineteenth Day of June, 2001

*Attest:*

NICHOLAS P. GODICI
*Attesting Officer*   Acting Director of the United States Patent and Trademark Office